June 12, 1928.
R. W. HATTON
1,673,283
CONVEYER
Filed Feb. 3, 1927    2 Sheets-Sheet 1
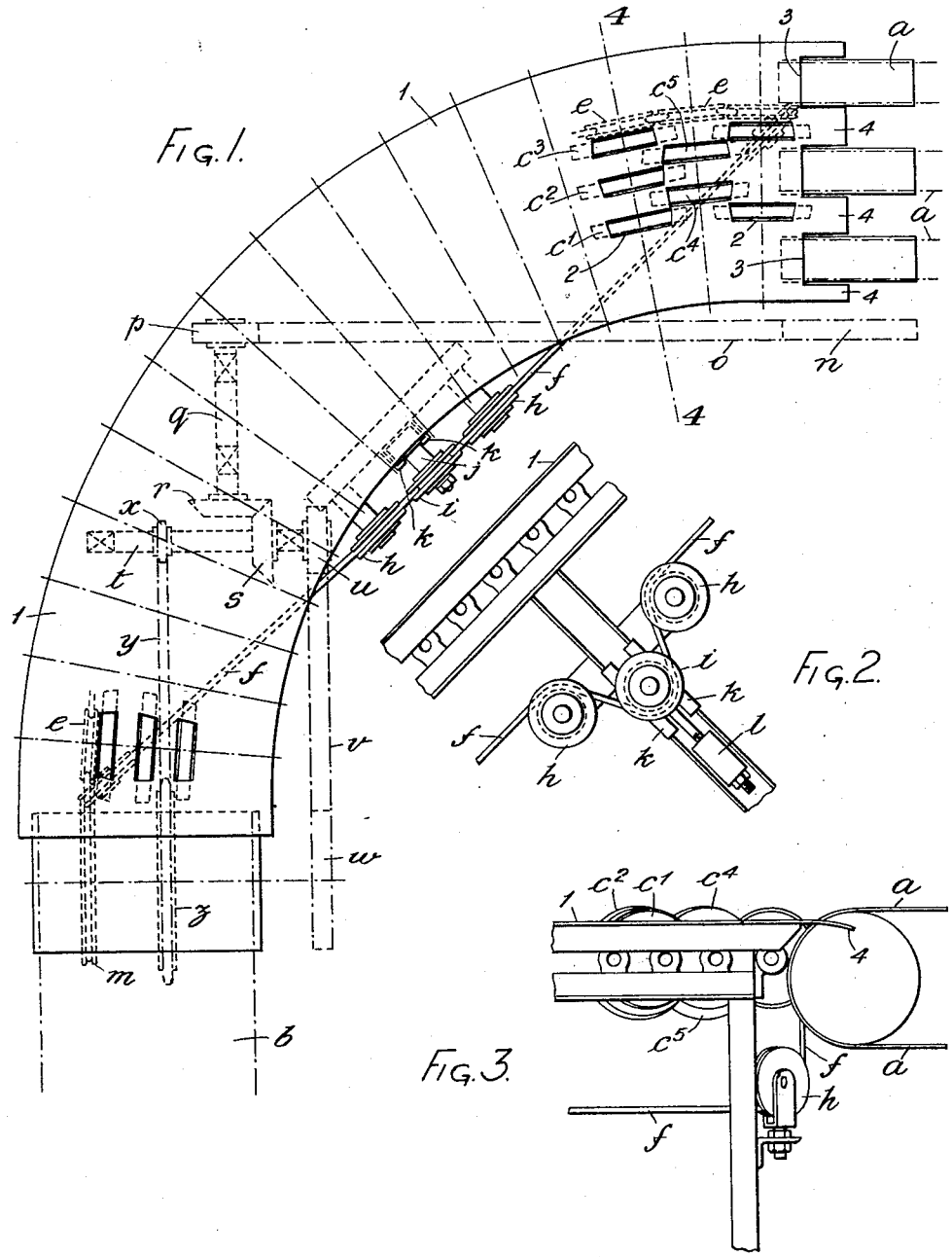

June 12, 1928.
R. W. HATTON
1,673,283
CONVEYER
Filed Feb. 3, 1927
2 Sheets-Sheet 2

Inventor
R.W. Hatton.

Patented June 12, 1928.

1,673,283

UNITED STATES PATENT OFFICE.

ROBERT WILLIAM HATTON, OF WALTHAM ABBEY, ENGLAND.

CONVEYER.

Application filed February 3, 1927, Serial No. 165,580, and in Great Britain December 16, 1926.

This invention relates to a curved conveyer or to a curved conveyer forming a corner section for belt conveyers, and has for its object to provide improved means of conveying or transferring goods along a curved path or around a corner from the end of one conveyer belt to another arranged at an angle thereto, the invention being particularly applicable for conveyers dealing with bundles of newspapers and the like.

I am aware that a series of coned rollers arranged in a curve struck from a suitable radius have been employed for transferring goods such as boxes and so forth around a corner from the end of one conveyer belt to another arranged at an angle thereto, but the present invention is particularly designed for the conveyance of loose or untied bundles of newspapers and other soft goods around a curve or corner without disarranging or damaging the goods or papers or without smudging the print of the latter when newly printed.

According to the present invention what I may term the curved conveyer or curved corner section of a conveyer, which may form the connection between the end of one conveyer belt and another arranged at an angle therewith, consists of groups of discs arranged on radial axes struck from a suitable centre, the discs in each radial group being suitably spaced apart and having their combined profile conforming to a curve similar to that of a tapered crown pulley or equivalent profile adapted for conveying the goods around the curve of the conveyer.

The said groups of discs are suitably driven and are preferably arranged to overlap.

The several radial groups of discs may be driven by V or grooved pulleys and a belt which is carried over suitable guide pulleys. For tensioning purposes the said belt may be carried over a jockey pulley working against a weight or spring. Alternatively spur skew gearing or equivalent may be employed.

The discs may be mounted so as to project through slots in a suitable horizontal table, preferably one having a smooth surface.

The accompanying drawings show one construction embodying the present invention as applied to horizontal conveyer belts for untied bundles of newspapers.

In the drawings,—

Fig. 1 is a plan,

Fig. 2 is a detail of the tensioning jockey gear.

Fig. 3 is a side elevation of the receiving end of the curved conveyer or corner section.

Figure 4:
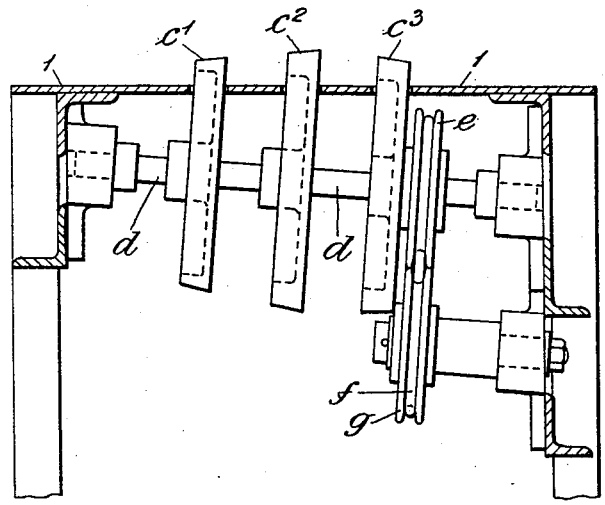
Fig. 4 is a transverse section of Fig. 1 on the line 4—4, drawn to a larger scale.
Figure 5:
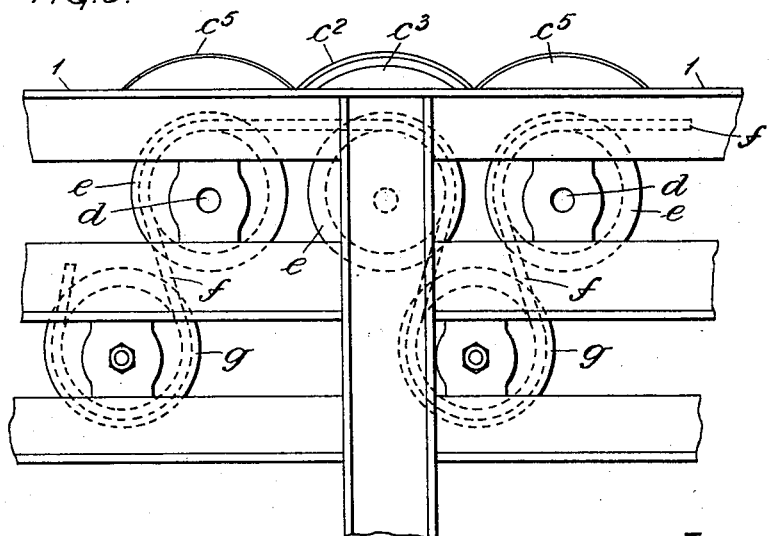
Fig. 5 is an elevation of Fig. 3 looking from the right.

In the construction illustrated, the two band conveyers $a$ and $b$ of usual form terminate at right angles and are connected by an improved curved conveyer or corner section comprising radial groups of vertically arranged discs, the example shown being provided with groups of three discs $c'$ $c^2$ $c^3$, suitably spaced apart and overlapped by groups of two discs $c^4$ $c^5$. As will be seen more clearly in Fig. 4, each group of discs in combined longitudinal profile follows the curve of a tapered and crowned pulley, that is to say, the periphery of the centre disc $c^2$ is practically horizontal or only slightly bevelled off or curved on each side whilst the discs $c'$ $c^3$ on each side are bevelled off, the outer one $c^3$ being larger than the inner one $c'$ to conform to the required taper.

The discs $c'$ $c^2$, $c^3$ and $c^4$ $c^5$ of each group are keyed upon separate spindles $d$ fitted at their outer ends with grooved or V pulleys $e$ and the pulleys $e$ of all the groups are driven by a common endless belt $f$ which is carried downwards and over idle guide pulleys $g$ arranged between every other pair of pulleys $e$ as shown, or in other appropriate manner. The endless belt $f$ is carried round to the inside of the curved conveyer or corner section by suitable guide pulleys $h$ and is passed over a tensioning jockey pulley $i$, the bearing $j$ of which is arranged to slide in vertical guides $k$ and carry a hanging weight $l$ of suitable design and arrangement.

The endless belt $f$ is driven by a suitable pulley $m$ arranged as shown at one end of the curved conveyer or corner section or otherwise conveniently, the said pulley $m$ and the groups of discs $c'$ $c^2$ $c^3$ and $c^4$ $c^5$, being of such dimensions that the peripheral speed of the centre disc $c^2$ is approximately the same as that of the conveyer belts $a$ and $b$ connected by the said corner section, the gear of the conveyer belts $a$ and $b$ and corner section discs $c'$ $c^2$ $c^3$ and $c^4$ $c^5$ being approximately arranged for this purpose.

The upper parts of the groups of discs $c'$ $c^2$ $c^3$ and $c^4$ $c^5$, are arranged to project a suitable distance through slots 2 in a curved table 1 preferably having a polished surface and forming the face of the corner section, the driving gear being arranged beneath the said table.

In the example shown the chain wheel $n$ of the conveyer belt $a$ drives by means of a chain $o$ and chain wheel $p$, the shaft $q$ which through bevel wheels $r$ $s$ drives a second shaft $t$ which carries a chain wheel $u$ driving by means of the chain $v$ the chain $w$ of the second conveyer belt $b$. On the shaft $t$ is mounted a chain wheel $x$ which drives by means of the chain $y$ the chain wheel $z$ which is mounted on the same shaft as the pulley $m$ which drives the endless belt $f$.

To facilitate the delivery of the papers to the discs of the curved corner section the ends of the conveyer belt $a$ which consists of narrow bands, is carried down through recesses in the receiving edge of the table 1, which edge between the recesses is suitably curved downwards as at 4.

In a modified arrangement a full tapered pulley of crowned profile may be employed where applicable, the said pulley being in some cases provided with circumferential grooves and ridges to provide the equivalent of the discs.

Although described as for the conveyance of united bundles of newspapers and the like, the apparatus may be applied as a curved conveyer corner section for conveying soft fabrics or similar goods.

It is to be understood that two or more of the improved curved conveyers such as the curved corner sections described may be employed and arranged end to end for conveying the goods around an S or other curve where required.

What I claim as my invention and desire to secure by Letters Patent is:—

1. A curved conveyer comprising the combination of, groups of driven discs arranged on axes radiating from a suitable centre, the discs in each radial group being spaced apart axially and having their combined profile conforming to a curve similar to that of a tapered crown pulley.

2. A curved conveyer forming a connecting corner section for transferring goods from the end of one conveyer belt to another arranged at an angle thereto comprising groups of driven discs arranged on axes radiating from a suitable centre, the discs in each radial group being spaced apart axially and having their combined profile conforming to a curve similar to that of a tapered crown pulley, a curved table provided with slots coinciding with the said discs, means for mounting said curved table in such relation to the discs that the latter project through the slots in the table.

3. A curved conveyer comprising the combination of groups of driven discs arranged so as to overlap and mounted on axes radiating from a suitable centre, the discs in each radial group being spaced axially apart and having their combined profile conforming to a curve similar to that of a tapered crown pulley.

4. A curved conveyer comprising the combination of groups of discs arranged to overlap and mounted on spindles radiating from a suitable centre, the discs in each radial group being spaced axially apart and having their combined profile conforming to a curve similar to that of a tapered crown pulley, a table provided with a series of slots corresponding to the discs, means for mounting said discs beneath the table with the upper parts of the discs projecting through said slots in the table, and means for driving the spindles of said discs.

5. A curved conveyer comprising the combination of groups of discs arranged to overlap and mounted on spindles radiating from a suitable centre, the discs in each radial group being spaced axially apart and having their combined profile conforming to a curve similar to that of a tapered crown pulley, a table provided with a series of slots corresponding to the discs, means for mounting said discs beneath the table with the upper parts of the discs projecting through said slots in the table, grooved pulleys on the spindles of said discs, interposed guide pulleys and means for supporting the same, a tensioning jockey pulley and means for mounting the same, an endless belt passing over and driving said grooved pulleys and also passing over said intermediate guide pulleys and tensioning jockey pulley, and means for driving said endless belt.

ROBERT WILLIAM HATTON.